United States Patent
Kazmi et al.

(10) Patent No.: US 10,187,884 B2
(45) Date of Patent: Jan. 22, 2019

(54) METHODS OF SUBFRAME PAIRING FOR MEASUREMENT GAP LENGTH CONFIGURATION IN DUAL CONNECTIVITY

(71) Applicant: Telefonaktiebolaget L M Ericsson (publ), Stockholm (SE)

(72) Inventors: Muhammad Kazmi, Bromma (SE); Imadur Rahman, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 84 days.

(21) Appl. No.: 14/894,490

(22) PCT Filed: Oct. 19, 2015

(86) PCT No.: PCT/EP2015/074112
§ 371 (c)(1),
(2) Date: Nov. 27, 2015

(87) PCT Pub. No.: WO2016/074883
PCT Pub. Date: May 19, 2016

(65) Prior Publication Data
US 2016/0295583 A1 Oct. 6, 2016

Related U.S. Application Data

(60) Provisional application No. 62/077,674, filed on Nov. 10, 2014.

(51) Int. Cl.
*H04W 72/04* (2009.01)
*H04W 76/15* (2018.01)
(Continued)

(52) U.S. Cl.
CPC ....... *H04W 72/0446* (2013.01); *H04W 24/08* (2013.01); *H04W 24/10* (2013.01);
(Continued)

(58) Field of Classification Search
CPC ............ H04W 24/08; H04W 72/0446; H04W 36/0088; H04W 76/025
See application file for complete search history.

(56) References Cited

U.S. PATENT DOCUMENTS

| | | | |
|---|---|---|---|
| 2017/0048108 A1* | 2/2017 | Yi | H04W 56/00 |
| 2017/0134976 A1* | 5/2017 | Uchino | H04W 16/32 |
| 2017/0150501 A1* | 5/2017 | Park | H04W 72/0446 |

FOREIGN PATENT DOCUMENTS

WO  WO 2015/194570 A  12/2015

OTHER PUBLICATIONS

International Search Report and Written Opinion Corresponding to International Application No. PCT/EP2015/074112; dated Feb. 3, 2016; 13 Pages.
(Continued)

*Primary Examiner* — Jeffrey M Rutkowski
*Assistant Examiner* — Basil Ma
(74) *Attorney, Agent, or Firm* — Sage Patent Group

(57) ABSTRACT

A method by a UE configured in DC includes receiving from a network node, configuration information of a measurement gap length for performing one or more radio measurements. Subframe pairs are determined between a MCG and a SCG with respect to measurement gap length in the MCG on which measurement gap length in the SCG can be configured. The measurement gap length is determined in at least the SCG using the determined subframe pairs. One or more radio measurements are performed in the SCG within the configured measurement gap length. Related UEs, methods by network nodes, and network nodes are disclosed.

18 Claims, 9 Drawing Sheets

(a) the maximum received timing difference at the UE is up to 33μs (b) the maximum received timing difference at the UE is more than 33μs

(51) Int. Cl.
*H04W 24/10* (2009.01)
*H04W 24/08* (2009.01)
*H04W 36/00* (2009.01)

(52) U.S. Cl.
CPC ....... *H04W 36/0088* (2013.01); *H04W 76/15* (2018.02); *H04W 36/0027* (2013.01); *H04W 36/0055* (2013.01)

(56) References Cited

OTHER PUBLICATIONS

Catt "UE behavior on measurement gap for dual connectivity", 3GPP TSG-RAN WG4 Meeting #72, Dresden, Germany, Aug. 18-22, 2014, R4-144276, 3 Pages.
Ericsson "Measurement gap length and interruptions in Dual Connectivity", 3GPP TSG RAN WG4 Meeting #72, Dresden, Germany, Aug. 18-22, 2014, R4-145014, 5 Pages.
Huawei, HiSilicon "Ad hoc minutes for LTE Dual Connectivity RRM", 3GPP TSG-RAN WG4 Meeting #72bis, Singapore, Oct. 6-10, 2014, R4-146648, 13 Pages.
NTT Docomo, Inc., NEC Corporation "New Work Item Description: Dual Connectivity for LTE", 3GPP TSG-RAN Meeting #62, Busan, Korea, Dec. 3-6, 2013, RP-132069, 6 Pages.
NTT Docomo, Inc., NEC Corporation "New Work Item Description: Dual Connectivity for LTE—Performance Part", 3GPP TSG-RAN Meeting #62, Busan, Korea, Dec. 3-6, 2013, RP-132069, 4 Pages.
NTT Docomo, Inc., NEC Corporation "New Work Item Description: Dual Connectivity for LTE—Core Part", 3GPP TSG-RAN Meeting #62, Busan, Korea, Dec. 3-6, 2013, RP-132069, 6 Pages.
Samsung "Discussion on UE measurement gap for Dual Connectivity", 3GPP TSG-RAN WG2 Meeting #87, Aug. 18-22, 2014, Dresden, Germany, R2-143121, 6 Pages.
ZTE "Measurement Gap and interruption requirements in unsynchronized operation for Dual Connectivity", 3GPP TSG-RAN WG4 Meeting #72bis, Singapore, Oct. 6-10, 2014, R4-145670, 3 Pages.
Notice of Preliminary Rejection dated Dec. 22, 2017 in corresponding Korean Patent Application No. 10-2017-7014745, 9 pages.
Ericsson "Measurement gap length in unsynchronized Dual Connectivity", 3GPP TSG RAN WG4 Meeting #72bis, R4-146360, Sep. 29, 2014; presented Oct. 6-10, 2014 Singapore; 5 Pages.
Office Action dated Jun. 12, 2018 in corresponding Japanese Patent Application No. 2017525043, 12 pages including English translation.
Catt, "Further discussion on UE behavior on measurement gap for DC," 3GPP TSG-RAN WG4 Meeting #72bis, Singapore, Oct. 6-10, 2014, R4-145643, 5 Pages.
InterDigital Communications, "RRC Signalling and Length of SCG Measurement Gap in LTE DC," 3GPP TSG-RAN WG2 #88, San Francisco, USA, Nov. 17-21, 2014, R2-145168, 7 Pages.

\* cited by examiner

Dual Connectivity Deployment Configuration

*MRTD=Maximum Receive Timing Difference

Maximum Receive Timing Difference At The UE

Subframe timing mismatch between $i^{th}$ and $j^{th}$ subframe by less than 500μs Subframe timing mismatch between $i^{th}$ and $j^{th}$ subframe by more than 500μs Subframe timing mismatch between $i^{th}$ and $j^{th}$ subframe by exactly one slot (i.e. 500μs)

(a) the maximum received timing difference at the UE is up to 33μs (b) the maximum received timing difference at the UE is more than 33μs

METHODS OF SUBFRAME PAIRING FOR MEASUREMENT GAP LENGTH CONFIGURATION IN DUAL CONNECTIVITY

RELATED APPLICATIONS

The present Application is a 35 U.S.C. § 371 national stage application of PCT International Application No. PCT/EP2015/074112, filed on Oct, 19, 2015, which itself claims the benefit of priority from U.S. Provisional Application No. 62/077,674 filed Nov. 10, 2014, the disclosure of which are hereby incorporated herein in their entirety by reference.

TECHNICAL FIELD

The present disclosure relates to methods and operations by network nodes and mobile stations for a dual connectivity framework.

BACKGROUND

A dual connectivity framework is currently being considered for LTE Rel-12. Dual Connectivity (DC) refers to operations where a given UE consumes radio resources provided by at least two different network points (Master eNB, MeNB; and Secondary eNB, SeNB) connected with non-ideal backhaul while in RRC_CONNECTED. A UE in DC maintains simultaneous connections to anchor and booster nodes, where the MeNB is interchangeably called anchor node and the SeNB is interchangeably called booster node. As the name implies, the MeNB controls the connection and handover of SeNB. No SeNB standalone handover is defined for Rel-12. Signaling in MeNB is needed even in SeNB change. Both the anchor node and booster node can terminate the control plane connection towards the UE and can thus be the controlling nodes of the UE.

The UE reads system information from the anchor. In addition to the anchor, the UE may be connected to one or several booster nodes for added user plane support. The MeNB and SeNB are connected via the Xn interface, which is currently selected to be the same as the X2 interface between two eNBs.

More specifically DC is a mode of operation of a UE in RRC_CONNECTED state, where the UE is configured with a Master Cell Group (MCG) and a Secondary Cell Group (SCG). Cell Group (CG) is a group of serving cells associated with either the MeNB or the SeNB.

A Master Cell Group (MCG) is a group of serving cells associated with the MeNB, including the PCell and optionally one or more SCells. A Secondary Cell Group (SCG) is a group of serving cells associated with the SeNB including the pSCell (Primary Scell) and optionally one or more SCells. A master eNB is the eNB which terminates at least S1-MME. A secondary eNB is the eNB that is providing additional radio resources for the UE but is not the Master eNB.

FIG. 1 illustrates a dual connectivity deployment configuration system having a plurality of MeNBs, SeNBs, and UEs. In this example, only one SeNB is connected to a UE, however, more than one SeNB can serve the UE in general. FIG. 1 also illustrates that dual connectivity is a UE specific feature and a network node can support a dual connected UE and a legacy UE at the same time.

As explained above, the anchor and booster roles are defined from a UE point of view. This means that a network node that acts as an anchor to one UE may act as a booster to another UE. Similarly, although a UE reads the system information from the anchor node, a network node acting as a booster to one UE may or may not distribute system information to another UE.

The terms anchor node and MeNB are used herein interchangeably. Similarly, the terms SeNB and booster node are used herein interchangeably.

The MeNB operates to provide system information, terminate the control plane of the layered protocol structure between a UE and a network node, and may also terminate the user plane. The SeNB operates to terminate the control plane or may operate to terminate only the user plane.

In one application, dual connectivity allows a UE to be connected to two network nodes to receive data from both network nodes and, thereby, increase the UE's data rate. This user plane aggregation may achieve similar benefits as carrier aggregation using network nodes that are not connected by a low-latency backhaul/network connection. Due to this lack of low-latency backhaul, the scheduling and HARQ-ACK feedback from the UE to each of the network nodes will need to be performed separately. That is, it's expected that the UE will have two UL transmitters to transmit UL control and data to the connected network nodes.

Synchronized or Unsynchronized Dual Connectivity Operation

Since dual connectivity (DC) operation involves two non-co-located transmitters (i.e. MeNB and SeNB), one of the main issues related to UE receiver performance is the maximum receive timing difference ($\Delta t$) of the signals from MeNB and SeNB received at the UE receiver. This gives rise to two cases of DC operation with respect to the UE: Case (1)—synchronized DC operation, and Case (2)—unsynchronized DC operation.

Synchronized operation used herein means that the UE can perform DC operation provided the received time difference ($\Delta t$) between the signals received at the UE from the component carriers (CCs) belonging to the MCG and SCG are within a certain threshold, e.g. ±30 µs. As a particular non-limiting example, the synchronized operation herein means that the received time difference ($\Delta t$) between the signals received at the UE from the subframe boundaries of the CCs belonging to the MCG and SCG are within a certain threshold, e.g. ±30 µs.

Unsynchronized operation used herein means that the UE can perform DC operation regardless of the received time difference ($\Delta t$) between the signals received at the UE from the CCs belonging to the MCG and SCG i.e. for any value of $\Delta t$. As a particular non-limiting example, the unsynchronized operation herein means that the received time difference ($\Delta t$) between the signals received at the UE from the subframe boundaries of the CCs belonging to the MCG and SCG can be any value, e.g. more than ±30 µs, any value up to ±0.5 ms etc.

Maximum receive timing difference ($\Delta t$) at the UE can have the following components:
 (1) Relative propagation delay difference between MeNB and SeNB,
 (2) Tx timing difference due to synchronization levels between antenna connectors of MeNB and SeNB, and
 (3) Delay due to multipath propagation of radio signals.

Relative Propagation Delay Difference

A maximum of 30.26 µs relative propagation delay corresponds to a worst case non-co-located CA coverage case, where the signal propagation distance is just over 9 km. In dense urban scenarios, maximum misalignment due to propagation delay that can be seen can be about 10 µs. The propagation delay is linearly related to relative physical distance between the network nodes. Consequently, there is a large amount of timing misalignment margin which may not be required due to distance between network nodes, and which means that there is a possibility to relax the requirement beyond certain transmit timing misalignment (i.e. synchronization accuracy between MeNB and SeNB), e.g. 3 µs. The 3 µs time is chosen here due to the co-channel synchronization accuracy requirement for TDD systems being 3 µs (which means that the tightest requirement that can be achieved is 3 µs).

Transmit Timing Difference Between MeNB and SeNB

The synchronized case essentially means that MeNB and SeNB transmit timing need to be synchronized up to a certain level of time accuracy, while the unsynchronized case provides a random value for synchronization accuracy (e.g., anything up to 1 ms), which is higher than the accuracy required in the synchronized case. It is noted that the receive timing difference is the received timing misalignment between two received signals at the UE or, in other words, is not the transmit timing mismatch levels between the MeNB and SeNB.

FIG. 2 illustrates the maximum receive timing difference at the UE. As the baseline option, it is assumed that dual Tx/Rx is used with a non-ideal backhaul, and that the MeNB and SeNB are not synchronized to each other. Dual Tx/Rx means that there can be separate PAs for separate links, such that no strict synchronization requirement is needed, and which is the case (2) explained above. Requirements defined for the un-synchronized case will also work for the synchronized case. However, considering the implementation and requirements issues for synchronized and unsynchronized dual connectivity operation, the following embodiments are provided for dual connectivity operation. Case (1) described above suggests defining certain synchronization accuracy between MeNB and SeNB.

Delay Due to Multipath Radio Environment

The received time difference of radio signals from MeNB and SeNB may also incorporate additional delay introduced by the multipaths due to the characteristics of the radio environment. For example, in a typical urban environment the delay spread of multiple paths received at the UE may be in the order of 1-3 µs. In contrast, for wide areas, such as sub-urban or rural deployment environments, the multipath effect on channel delay spread of signals observed at the UE can be relatively smaller, e.g. less than 1 µs.

Dual Connectivity is a UE Specific Operation

In general, network-wide synchronization is not needed for dual connectivity since dual connectivity is a UE specific operation. A UE can be connected to two eNBs in dual connectivity operation, thus the synchronization requirement is needed between only two eNBs when they serve the UE for dual connectivity operation, i.e. the involved MeNB and SeNB. It is noted that the same MeNB and SeNB may also be serving UEs not in dual connectivity. Thus, no synchronization requirements, even between MeNB and SeNB, are specified. However to ensure that the UE operating in dual connectivity is able to receive signals from MeNB and SeNB within the maximum allowed received time difference, the following conditions related to the involved eNBs are defined for the UE to meet:

1. The received time difference at the UE from the MeNB and the SeNB is within the allowed limit; and
2. The maximum transmit time difference between the MeNB and the SeNB is within certain time limit.

RRM Measurement

Several radio related measurements (RRMs) are used by the UE or the radio network node to establish and keep the connection, as well as to ensure the quality of a radio link.

The UE has to first detect a cell and therefore cell identification, e.g. acquisition of a physical cell identity (PCI), which is a signal measurement. The UE may also have to acquire the cell global ID (CGI) of a UE.

The UE reads the system information (SI) of the target cell (e.g., intra-, inter-frequency or inter-RAT cell) upon receiving an explicit request from the serving network node via radio resource control (RRC) signaling, e.g. from RNC in HSPA or eNode B in case of LTE. The acquired SI is then reported to the serving cell. The signaling messages are defined in the relevant HSPA and LTE specifications.

In order to acquire the SI which contains the cell global identifier (CGI) of the target cell, the UE has to read at least part of the SI including a master information block (MIB) and the relevant system information block (SIB) as described later. The terms SI reading/decoding/acquisition, CGI/ECGI reading/decoding/acquisition, and CSG SI reading/decoding/acquisition are interchangeably used herein and may have the same or similar meaning.

The reference signal received power (RSRP) and reference signal received quality (RSRQ) are the two existing measurements used for at least RRM such as for mobility, which include mobility in RRC connected state as well as in RRC idle state. The RSRP and RSRQ are also used for other purposes such as for enhanced cell ID positioning, minimization of drive test, etc. Other examples of UE measurements are UE Rx-Tx time difference measurement, reference signal time difference (RSTD), etc.

In RRC connected state the UE can perform intra-frequency measurements without measurement gaps. However as a general rule the UE performs inter-frequency and inter-RAT measurements in measurement gaps unless it is capable of performing them without gaps. Two periodic measurement gap patterns both with a measurement gap length of 6 ms are defined for LTE:

Measurement gap pattern #0 with repetition period 40 ms; and

Measurement gap pattern #1 with repetition period 80 ms.

The measurements performed by the UE are then reported to the network for use in various tasks.

The radio network node (e.g. base station) may also perform signal measurements. Examples of radio network node measurements in LTE are propagation delay between a UE and itself, uplink (UL) signal-to-interference-plus-noise (SINR), UL signal-to-noise ratio (SNR), UL signal strength, Received Interference Power (RIP), timing advance (TA), eNode Rx-Tx time difference measurement, etc. The eNB may also perform positioning measurements which are described further below.

The UE also performs measurements on the serving cell (e.g., primary cell) in order to monitor the serving cell performance. This is referred to as radio link monitoring (RLM) or RLM related measurements in LTE.

For RLM the UE monitors the downlink link quality based on the cell-specific reference signal in order to detect the downlink radio link quality of the serving or PCell.

In order to detect out of sync and in sync the UE compares the estimated quality with the thresholds Qout and Qin respectively. The threshold Qout and Qin are defined as the level at which the downlink radio link cannot be reliably received and corresponds to 10% and 2% block error rate of a hypothetical PDCCH transmissions respectively.

Potential Problems with Existing Approaches

Currently, measurement gap length is defined independently for each CG in dual connectivity. This means that, when SFN synchronization is not assumed in dual connectivity, the UE will not know on which subframes to enforce the MGL for SCG with respect to MGL that is configured in MCG.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

One embodiment of the present disclosure is directed to a method by a UE configured in DC. The method includes receiving from a network node, configuration information of a measurement gap length for performing one or more radio measurements. Subframe pairs are determined between a MCG and a SCG with respect to measurement gap length in the MCG on which measurement gap length in the SCG can be configured. The measurement gap length is determined in at least the SCG using the determined subframe pairs. One or more radio measurements are performed in the SCG within the configured measurement gap length.

A potential advantage of this method is that the network node can know how the UE will perform measurements during the measurement gap while the UE is configured to operate in unsynchronized DC. The network node may thereby adapt scheduling so that the UE is not scheduled in a subframe before or after the gap where the UE is not required to transmit, and the network node may assign resources (e.g. UL allocation, grant, etc) to another UE that can transmit in a subframe where the UE configured with unsynchronized DC cannot transmit.

Another embodiment is directed to a corresponding UE that is configured in DC and configured to receive from a network node, configuration information of a measurement gap length for performing one or more radio measurements. The UE determines subframe pairs between a MCG and a SCG with respect to measurement gap length in the MCG on which measurement gap length in the SCG can be configured. The UE configures the measurement gap length in at least the SCG using the determined subframe pairs, and performs one or more radio measurements in the SCG within the configured measurement gap length.

Another embodiment is directed to a method by a network node serving a UE configured in DC. The method includes determining a synchronization level of signals received at the UE from subframe boundaries of a MCG and a SCG, and determining if the UE is configured in unsynchronized DC or if the network node cannot ascertain from the synchronization level whether the UE operates in unsynchronized DC or synchronized DC. Based on determining that the UE is configured in unsynchronized DC or that the network node cannot ascertain from the synchronization level whether the UE operates in unsynchronized DC or synchronized DC, the method selects one of a plurality of pre-defined rules based on one or more criteria, wherein the selected one of the pre-defined rules enables the UE to pair subframes from the MCG and the SCG for determining measurement gap length in the MCG and the SCG, configures the UE with the selected one of the plurality of pre-defined rules, and configures the UE with the measurement gap length for operating to perform one or more radio measurements based on the measurement gap length.

Another embodiment is directed to a corresponding network node serving a UE configured in DC. The network node is further configured to determine synchronization level of signals received at the UE from subframe boundaries of a MCG and a SCG, and determine if the UE is configured in unsynchronized DC or if the network node cannot ascertain from the synchronization level whether the UE operates in unsynchronized DC or synchronized DC. Based on determining that the UE is configured in unsynchronized DC or that the network node cannot ascertain from the synchronization level whether the UE operates in unsynchronized DC or synchronized DC, the network node selects one of a plurality of pre-defined rules based on one or more criteria, wherein the selected one of the pre-defined rules enables the UE to pair subframes from the MCG and the SCG for determining measurement gap length in the MCG and the SCG, configures the UE with the selected one of the plurality of pre-defined rules, and configures the UE with the measurement gap length for operating to perform one or more radio measurements based on the measurement gap length.

Other methods, UEs, and network nodes according to embodiments of the invention will be apparent to one with skill in the art upon review of the following drawings and detailed description. It is intended that all such additional methods, UEs, and network nodes be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings.

DETAILED DESCRIPTION

1. Introduction

Figure 1:
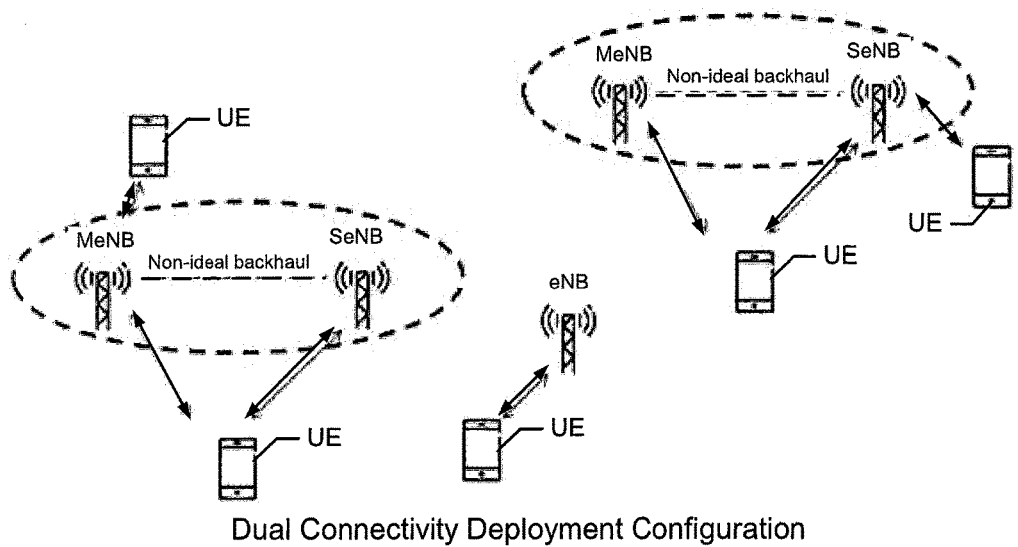
FIG. 1 illustrates a dual connectivity deployment configuration.
Figure 2:
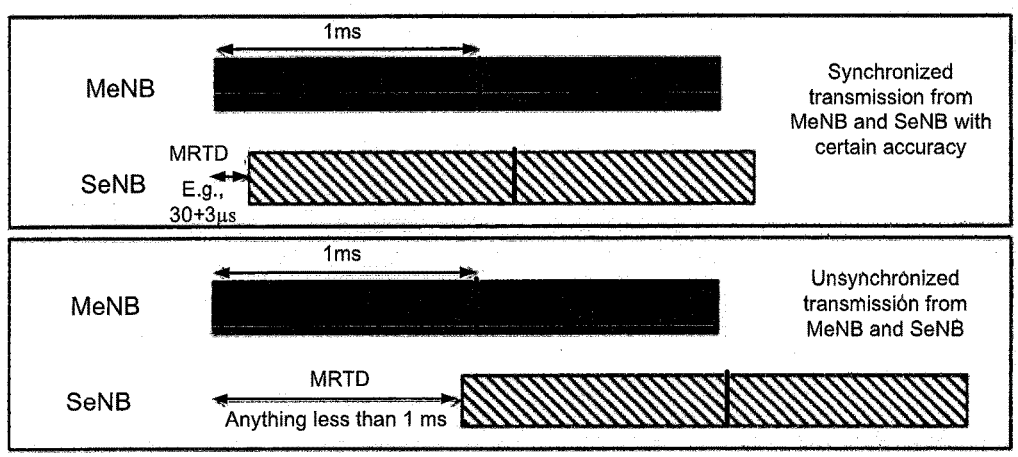
FIG. 2 illustrates an example maximum receive timing difference at the UE.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

In some embodiments a more general term "network node" is used and it can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) node such as MSR BS, eNodeB, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), core network node (e.g. MSC, MME etc), operation & maintenance (O&M) node, operation support system (OSS), SON, positioning node (e.g. E-SMLC), MDT etc.

In some embodiments the non-limiting term user equipment (UE) is used to refer to any type of wireless device communicating with a network node and/or with another UE in a cellular or mobile communication system. Examples of a UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, etc.

The embodiments are applicable to single carrier as well as to multicarrier or carrier aggregation (CA) operation of the UE in which the UE is able to receive and/or transmit data to more than one serving cell. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carriers (SCCs) or simply secondary carriers or even supplementary carriers. The serving cell is interchangeably called primary cell (PCell) or primary serving cell (PSC). Similarly the secondary serving cell is interchangeably called secondary cell (SCell) or secondary serving cell (SSC).

Various embodiments are described herein for LTE. However these and other embodiments are applicable to any RAT or multi-RAT systems, where the UE receives and/or transmit signals (e.g. data), including, but not limited to, LTE FDD/TDD, WCDMA/HSPA, GSM/GERAN, Wi Fi, WLAN, CDMA2000, etc.

Various concepts of these embodiments can be extended to FDD-FDD inter-band, to TDD-TDD inter-band or TDD intra-band, and/or to a combination of FDD and TDD inter-band carriers. These concepts may be equally applicable to more than one SeNB.

The following assumptions can apply to dual connectivity:
1. The SFN alignment may not be possible between MCG and SCG; and
2. There may be a maximum of 500 μs of maximum receive timing difference between signals in subframe level from MeNB and SeNB.

Figure 3A:
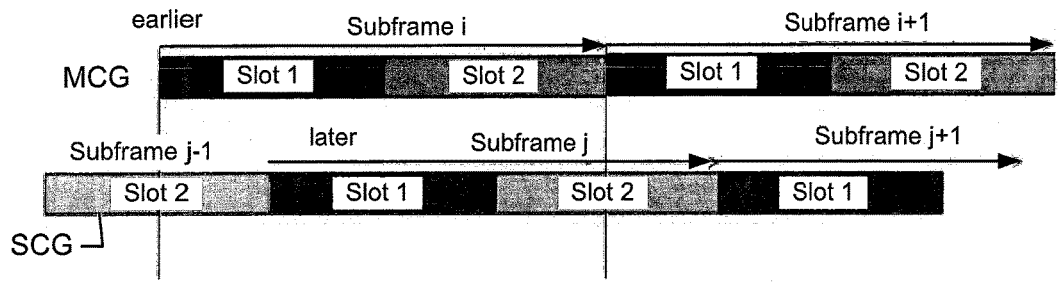
FIGS. 3(a)-(c) illustrate different levels of subframe timing mismatch between pairs of subframes in MCG and SCG, respectively.
Figure 3B:
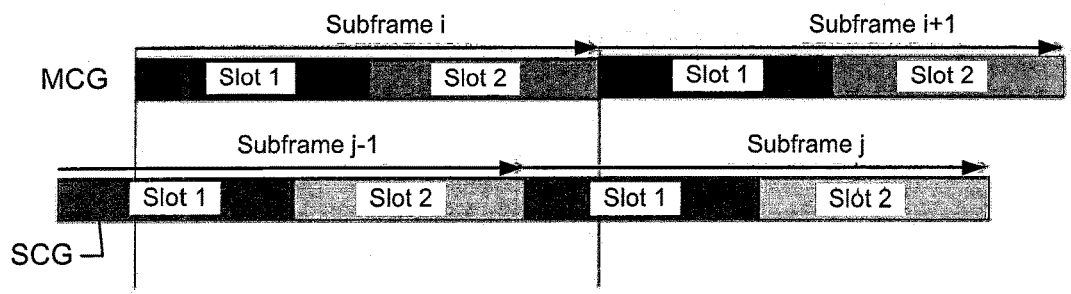
Figure 3C:
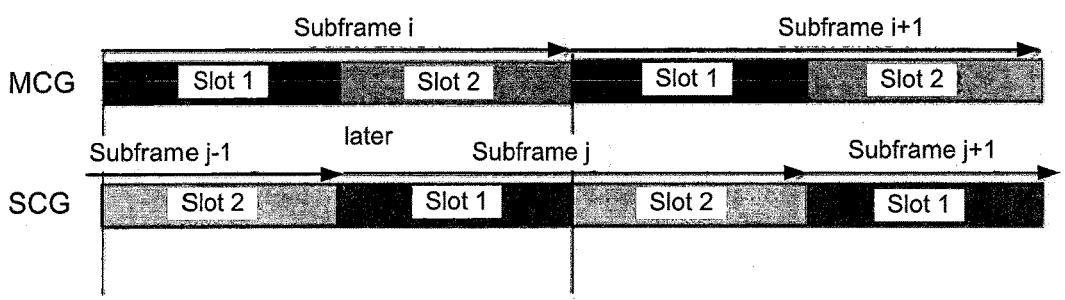

As seen in FIGS. 3(a)-(c), there are mainly three possibilities of subframe boundary mismatch between received signals from MCG and SCG at the UE. FIG. 3(a) illustrates a subframe boundary mismatch that is less than 500 μs, which by extension includes the synchronized case. FIG. 3(b) illustrates a subframe boundary mismatch that is more than 500 μs looking at the beginning of the subframes in the temporal domain. FIG. 3(c) illustrates a subframe boundary mismatch that is exactly 500 μs, which may have a very little probability of occurring, e.g., on the order of 0.2% probability.

In RAN2, MGL is configured in MCG and the SCG follows. In other words, once the subframe numbers for MGL in MCG are known to the UE, the UE has to find out the corresponding subframe numbers of the SCG, so that MGL can be defined for SCG based thereon.

To define the subframe pairs for MGL in dual connectivity, various embodiments identify the two subframes at the beginning of the MGL on MCG and SCG that will be paired together. This operation can be used for both synchronized and unsynchronized cases.

2. Option-1 for Methods in UEs and Related UEs for Subframe Pairing Based on Overlapping on Slot 1 of the Subframes In some embodiments, methods and operations for pairing of subframes from MCG and SCG for determining MGL can be implemented in a UE based on one or more pre-defined rules. The UE may also be configured with the rule or method for pairing subframes based on an indication received from the network node, which is described further below in Section 4 below.

Based on the illustrations in FIGS. 3(a)-(c), it could be challenging for a UE to find the subframe pairs that should be considered for MGL in MCG and SCG.

According to this option, to constitute a subframe pair that should be considered for MGL in MCG and SCG, a UE can identify a subframe pair as a subframe in the MCG and a subframe in the SCG that overlap with each other in a defined time slot. More particularly, the UE can consider the subframes in MCG and MCG whose slot1 (i.e. 1st time slot in MCG subframe and 1st time slot in SCG subframe) overlap with each other, as one or more subframe pairs between the MCG and the SCG with respect to MGL in the MCG on which MGL in the SCG can be configured. In this way, the beginnings of the subframes are always considered for constituting the subframe pair for MGL in MCG and SCG.

In the illustrated case of FIG. 3(a), subframe i in MCG and subframe j in SCG constitutes the subframe pair. Similarly, subframe i in MCG and subframe j-1 in SCG constitutes the subframe pair in FIG. 3(b). So, in this approach, the MGL is derived based on the following main principles.

The subframes in one control group (CG) that overlap with subframes in another CG in their respective slot 1 should be paired together between CGs.

There is a need for a 7th subframe in SCG in addition to 6 subframes in measurement gap (e.g., 6 ms measurement gap). The measurement gap in the SCG can then start from the first subframe. Thus, in this approach, the 7th subframe is subframe j−1 in case of FIG. 3(*a*), i.e. the earlier subframe with respect to 6 ms MGL (when MCG leads SCG), while it is subframe j+5 in case of FIG. 3(*b*), but not shown in FIG. 3(*b*), i.e. the later subframe with respect to 6 ms MGL (when SCG leads MCG).

Figure 4:
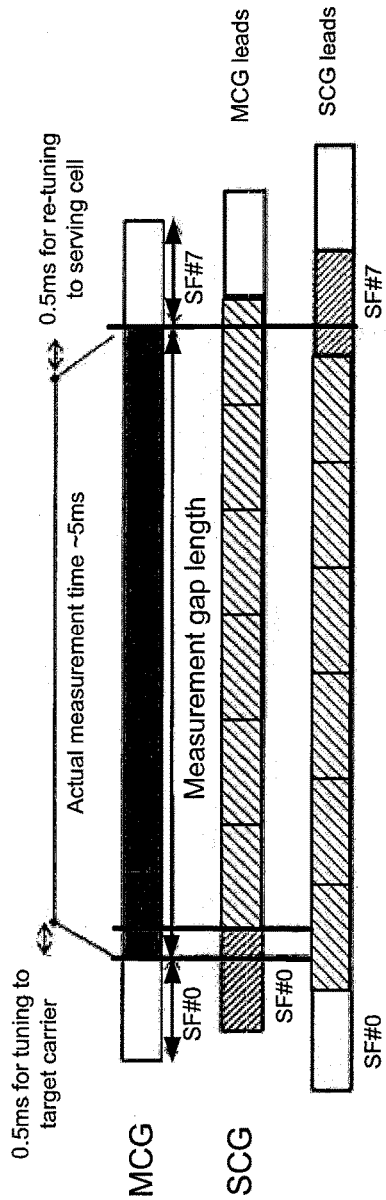
FIG. 4 illustrates configuration of MGL in MCG and SCG based on a disclosed option-1 for subframe pairing, according to some embodiments.

The resulting MGL at both MCG and SCG is shown in FIG. 4. In this case, when MCG leads, then SF#0 is included in MGL for SCG. In contrast, when SCG leads, then SF#7 is included in MGL for SCG.

So, the UE operations can include the following:
1. When MCG leads, e.g., the first time slot of the MCG leads the first time slot of the SCG,
   a. use subframe (SF) SF#1 to SF#6 as the measurement gap length for both MCG and SCG,
      i. General gap behavior applies here, and
   b. SCG cannot receive or transmit in SF#0, e.g., prevent the UE from receiving and transmitting during subframe 0.
2. When SCG leads, e.g., the first time slot of the SCG leads the first time slot of the MCG,
   a. use SF#1 to SF#6 as the measurement gap length for both MCG and SCG,
      i. General gap behavior applies here, and
   b. SCG cannot receive or transmit in SF#7, e.g., prevent the UE from receiving and transmitting during subframe 7.

3. Option-2 for Methods in UEs and Related UEs for Subframe Pairing by Overlapping Based on First Immediate Subframe in SCG with Respect to MCG MGL In some other embodiments, methods and operations for pairing of subframes from MCG and SCG for determining MGL can be implemented in a UE based on one or more pre-defined rules. The UE may also be configured with a rule for pairing subframes based on an indication (configuration information) received from the network node, such as described below in Section 4.

Figure 5:
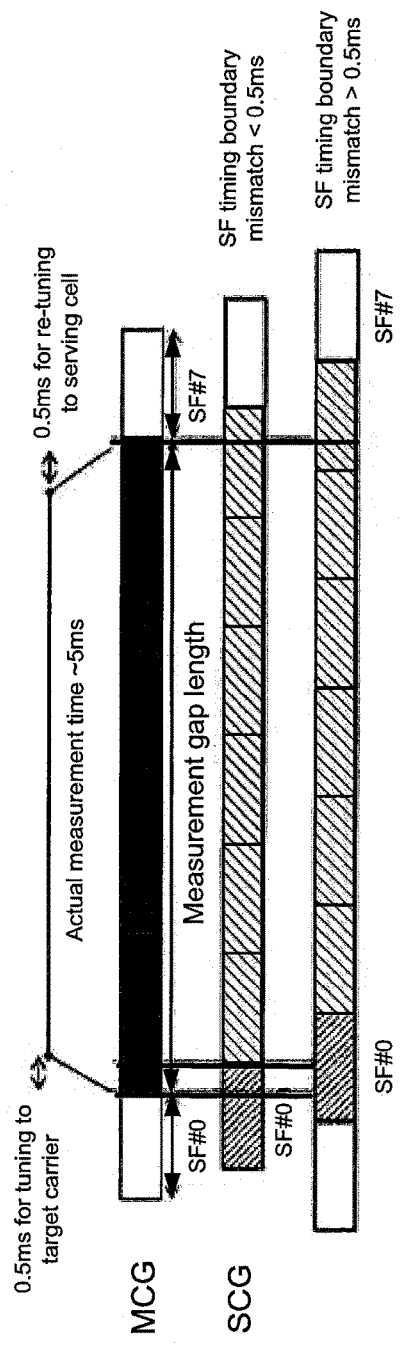
FIG. 5 illustrates configuration of MGL in MCG and SCG based on a disclosed option-2 for subframe pairing, according to some embodiments.

According to Option 2, a 6 ms window in SCG will start from a SCG subframe that starts after a first subframe in the MCG gap. FIG. 5 illustrates the corresponding timing and operation for Option 2 according to some embodiments. This approach can be easier for the UE to implement and may also be easier for the network node to perform associated scheduling since the 7th subframe is always the subframe earlier with respect to 6 ms MGL. Also, only one definition of MGL is constituted in this option.

UE operations may be as follows:
1. use SF#1 to SF#6 as the measurement gap length for both MCG and SCG,
   a. General gap behavior applies here, and
2. SCG cannot receive or transmit in SF#0, e.g., prevent the UE from receiving and transmitting during subframe 0.

The approach can include defining the subframe pairs for MCG and SCG in a way so that the first subframe in the MGL of SCG will be the subframe that starts immediately after the first subframe of MCG has started.

4. Methods in Network Nodes and Related Network Nodes for Configuring a Subframe Pairing Rule at a UE for Enabling the UE to Determine MGL In some other embodiments the network node operates to select, based on one or more criteria, one of two defined rules (e.g., a rule defined by the Option-1 approach disclosed in Section 2 and another rule defined by the Option-2 approach disclosed in Section 3). The selected one of the two defined rules is performed by the network node to enable the UE to perform subframe pairing (i.e. for pairing of subframes from MCG and SCG) for determining the MGL of the measurement gap in MCG and SCG, when the UE is Configured with DC operation. The network node then configures the UE with the selected one of the two defined rules.

Example criteria that can be used by the network node to select between the defined rules, can include simplicity in scheduling UEs before or after a measurement gap, UE complexity, implementation flexibility, etc. For example, in order to provide a simpler and consistent scheduling mechanism (e.g., same subframe 0 is not used for scheduling) and/or to simplify UE implementation then the rule 2 defined by Option-2 may be selected by the network node. In contrast, in order to allow more implementation flexibility in terms of scheduling in different subframes, rule 1 defined by Option-1 may be selected by the network node.

The network node may decide to configure the UE with one of the rules (rule 1 or rule 2) when the network node determines that the UE is configured with unsynchronized DC operation.

The network node may also decide to configure the UE with one of the rules (rule 1 or rule 2) when the network node cannot determine or cannot explicitly determine that the UE is configured with unsynchronized DC operation, e.g., when the network node is not certain about the synchronization level with which the UE operates with DC.

In a further embodiment, the network node serving a UE configured in DC performs a method that includes determining a synchronization level of signals received at the UE from subframe boundaries of a MCG and a SCG. The method further includes determining if the UE is configured in unsynchronized DC or if the network node cannot ascertain from the synchronization level whether the UE operates in unsynchronized DC or synchronized DC. Based on the determination that the UE is configured in unsynchronized DC or that the network node cannot ascertain from the synchronization level whether the UE operates in unsynchronized DC or synchronized DC. The method further includes: selecting one of a plurality of pre-defined rules based on one or more criteria, wherein the selected one of the pre-defined rules enables the UE to pair subframes from the MCG and the SCG for determining measurement gap length in the MCG and the SCG; configuring the UE with the selected one of the plurality of pre-defined rules; and configuring the UE with the measurement gap length for operating to perform one or more radio measurements based on the measurement gap length.

In a further embodiment, the network node uses this information of the selected one of the pre-defined rules and the measurement gap length used by the UE to adapt its scheduling of resources (e.g. UL allocation, grant, etc) for UEs so that the UE is not scheduled in a subframe before or after the gap where the UE is not required to transmit. In an alternative or additional embodiment, the network node can use this information to assign resources (e.g. UL allocation, grant, etc) to another UE that can transmit in a subframe where the UE configured with unsynchronized DC cannot transmit.

Thus in further embodiments, the method by the network node can schedule resources for assignment to UEs so that the UE is not scheduled for transmission in a subframe before or after a measurement gap. The method by the network node can schedule the resources for assignment to another UE that can transmit in the subframe before or after the measurement gap.

5. Methods in UEs and Related UEs for Adapting Subframe Pairing Based on Level of Synchronization A DC capable UE may be configured by the network node with different levels of synchronization. For example, a UE capable of operating in both unsynchronized DC and synchronized DC scenarios may be configured with either unsynchronized DC or synchronized DC operations by the network node.

The DC capable UE may also be configured with measurement gaps for performing inter-frequency and/or inter-RAT measurements while the same UE is also configured in the DC operation.

In this embodiment the UE adapts (e.g., switches) between a first method and a second method for determining the MGL in MCG and SCG based on the synchronized level with which the UE is configured to operate in DC. For example the UE:

- may apply the first method for determining the MGL when configured to operate (e.g., responsive to operating) in synchronized DC, wherein in the first method the MGL is the same in MCG and SCG; and
- may apply the second method for determining the MGL when configured to operate (e.g., responsive to operating) in unsynchronized DC, wherein the second method is one of the methods described in the preceding Sections 2-4. In the second method the UE uses a rule (e.g. rule 1 or rule 2 in the respective preceding Section 2 or Section 3) to first pair the subframes of MCG and SCG and, based on the pairing, determine the MGL in SCG and MCG.

According to this embodiment, the UE, which is configured or being configured in DC, obtains (receives) from a network node a Message containing configuration information of a measurement gap for performing one or more radio measurements. The UE obtains (determines) information about a level of synchronization with which the UE is configured to operate in DC, where the level of synchronization includes the received time difference of signals from different CGs, e.g. MCG and SCG. The UE can determine the synchronization level of signals received at the UE from subframe boundaries of the MCG and the SCG.

The UE then selects between the following two operations for determining the MGL in SCG and MCG based on the obtained information,

- the UE uses the same MGL in MCG and SCG; and
- the UE pairs the subframes from MCG and SCG according to one of the rules as described in the preceding Sections 2-4, and where the rule to be used by the UE is determined based on pre-defined information or information received from the network node.

The UE then uses the determined MGL in MCG and SCG for performing one or more radio measurements in the measurement gaps.

The UE can determine or obtain information about the level of synchronization with which the UE is configured to operate in DC autonomously (e.g. based on received time difference of signals from CGs), based on an indication received from the network node, etc.

6. Further Explanation of Various Embodiments

As explained above, various embodiments of the present disclosure are directed to methods and operations performed by network nodes and user equipment.

Figure 6:
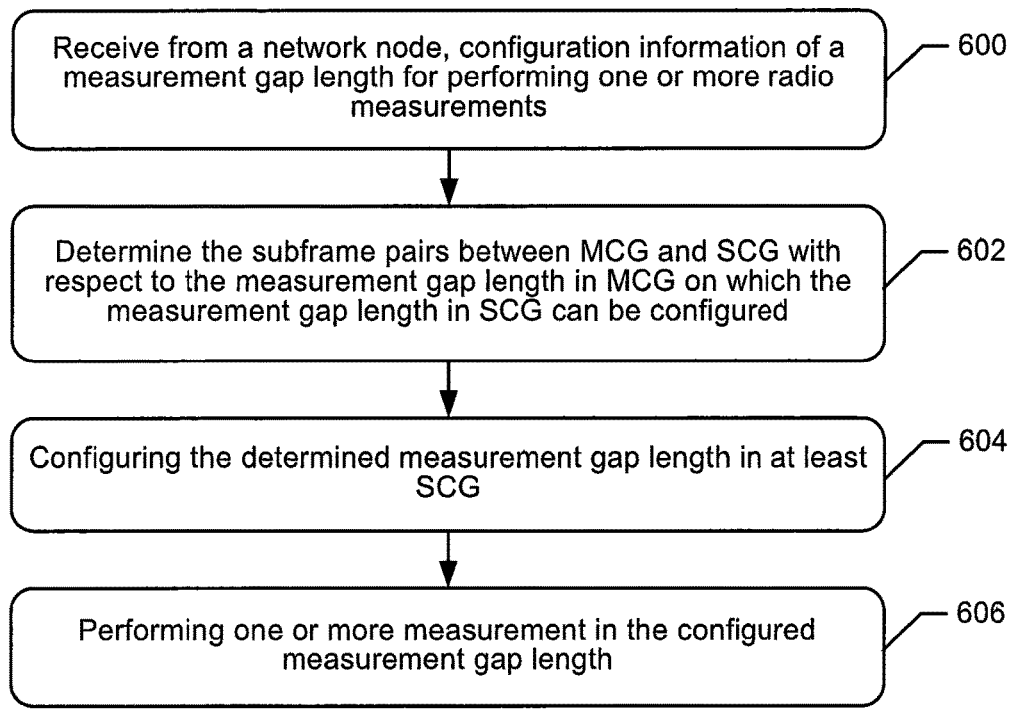
FIGS. 6-8 are flowcharts of operations and methods by a UE configured in dual connectivity (DC), according to some embodiments.
Figure 7:
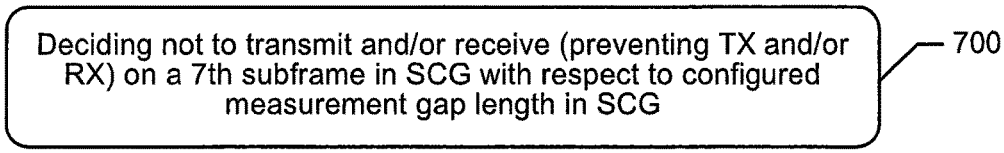

Some embodiments are directed to a method in a UE configured in dual connectivity (DC) and which operates as described below with reference to the flowcharts of FIGS. 6-8. The method includes receiving (block 600), from the network node, configuration information of the measurement gaps for performing one or more radio measurements. The method includes determining (block 602) the subframe pairs between MCG and SCG with respect to the MGL in MCG on which the MGL in the SCG can be configured. The method includes configuring (block 604) the determined MGL in at least the SCG. The UE performs (block 606) one or more measurements in the configured MGL.

A potential advantage of this method is that the network node can know how the UE will perform measurements during the measurement gap while the UE is configured to operate in unsynchronized DC. The network node may thereby adapt scheduling so that the UE is not scheduled in a subframe before or after the gap where the UE is not required to transmit, and the network node may assign resources (e.g. UL allocation, grant, etc) to another UE that can transmit in a subframe where the UE configured with unsynchronized DC cannot transmit.

In a further embodiment, the method in the UE includes deciding (block 700) not to transmit or receive on a defined (e.g., 7th) subframe in SCG with respect to the configured MGL in the SCG. As explained above in Section 2, the method in the UE can include determining (block 602) subframe pairs between the MCG and the SCG with respect to measurement gap length in the MCG on which measurement gap length in the SCG can be configured, based on identifying a subframe pair as a subframe in the MCG and a subframe in the SCG that overlap with each other in a defined time slot.

Moreover, as explained above in Section 2, the method in the UE can include the UE responding to the defined time slot of the MCG leading the defined time slot of the SCG, by using a first subframe through a sixth subframe as the measurement gap length for the MCG and SCG, and preventing the UE from receiving and transmitting during a subframe immediately before the first subframe. The UE further responds to the defined time slot of the SCG leading the defined time slot of the MCG, using the first subframe through the sixth subframe as the measurement gap length for the MCG and SCG, and preventing the UE from receiving and transmitting during the subframe immediately after the sixth subframe.

In another embodiment, the UE responds to the defined time slot of the MCG leading the defined time slot of the SCG, by using subframes 1 through 6 as the measurement gap length for the MCG and SCG, and preventing the UE from receiving and transmitting during subframe 0. The UE further responds to the defined time slot of the SCG leading the defined time slot of the MCG, by using subframes 1 through 6 as the measurement gap length for the MCG and SCG, and preventing the UE from receiving and transmitting during subframe 7.

In an alternative or additional embodiment, a method in the UE includes: receiving (block 800) from the network node, configuration information of the measurement gaps for performing one or more radio measurements; determining (block 802) synchronization level of signals received at the UE from subframe boundaries of MCG and SCG; determining (block 804) based on the determined synchronization level whether or not to pair subframes from the MCG and SCG for determining the MGL in the MCG and SCG; determining (block 806) the measurement gap length (MGL) in the MCG and SCG based on performing the determination (block 602) subframe pairs between the MCG and SCG; and performing (block 808) measurements in the configured measurement gaps using the determined MGL. The method for determining (block 806) the measurement gap length (MGL) in the MCG and SCG can be based on a subframe pair between the MCG and the SCG determined as a result of the determination (block 804) to pair subframes from the MCG and the SCG.

The determination (block 802) of the synchronization level of signals received at the UE from subframe boundaries of the MCG and the SCG, can include determining the synchronization level based on a received time difference of signals from the MCG and the SCG.

The pairing of subframes from the MCG and the SCG to determine the measurement gap length in the MCG and the SCG, can include identifying a subframe pair as a subframe in the MCG and a subframe in the SCG that overlap with each other in a defined time slot. The pairing of subframes from the MCG and the SCG to determine the measurement gap length in the MCG and the SCG, can alternatively include identifying a subframe in the SCG that starts after a defined subframe in a MCG gap, and configuring the measurement gap length in the SCG using the subframe in the SCG that is identified as starting after the defined subframe in the MCG gap.

Figure 9:
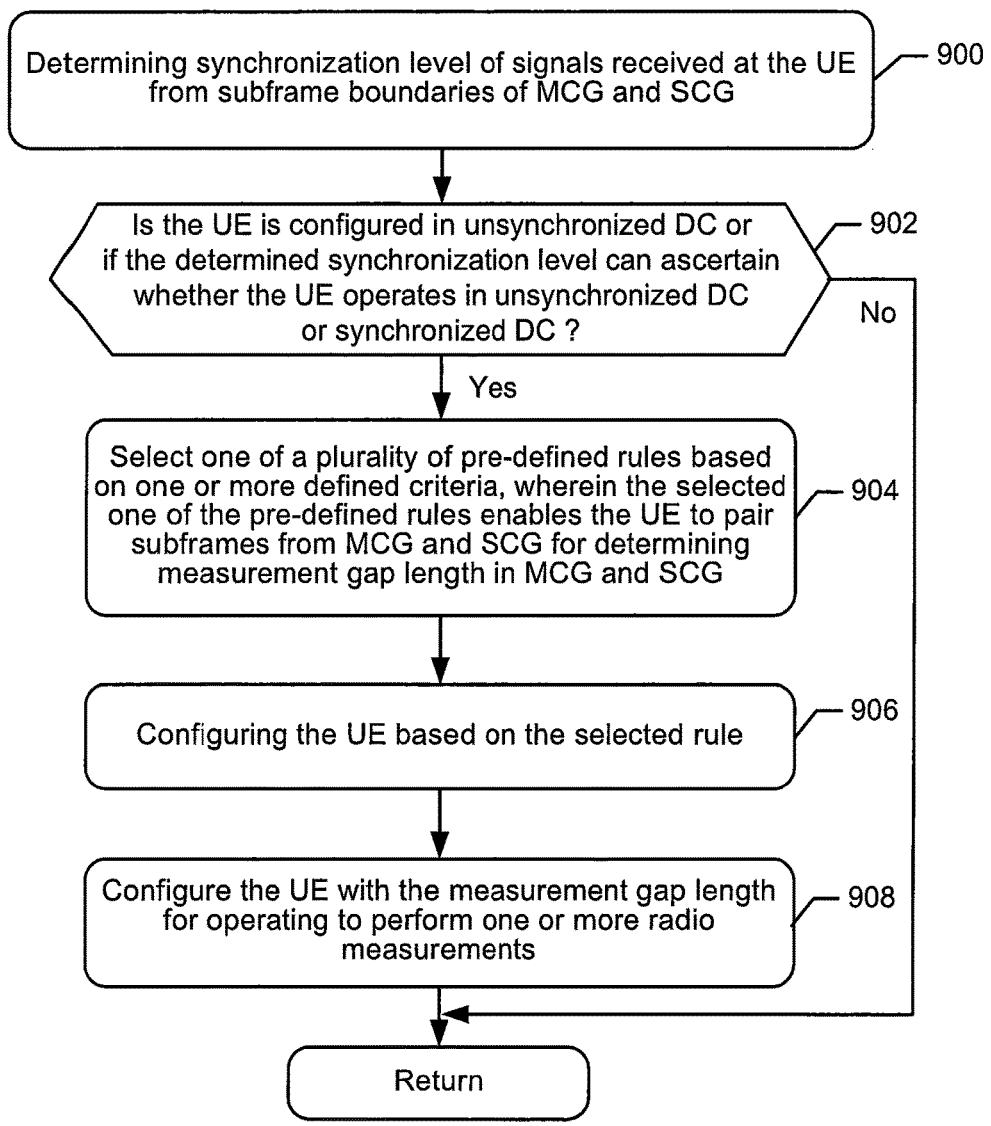
FIG. 9 is a flowchart of operations and methods by a network node serving a UE configured in dual connectivity (DC), according to some embodiments.

FIG. 9 illustrates methods in a network node serving a UE configured in DC, in accordance with some embodiments. Referring to FIG. 9, the methods include determining (block 900) a synchronization level of signals received at the UE from subframe boundaries of MCG and SCG, and determining (block 902) if the UE is configured in unsynchronized DC or if the determined synchronization level cannot ascertain whether the UE operates in unsynchronized DC or synchronized DC. Based on determining (902) that the UE is configured in unsynchronized DC or that the network node cannot ascertain from the synchronization level whether the UE operates in unsynchronized DC or synchronized DC, the methods in the network node further include: selecting (block 904) one of the plurality of the pre-defined rules based on one or more criteria, wherein the rule enables the UE to pair subframes from MCG and SCG for determining the MGL in MCG and SCG; configuring (block 906) the UE with the selected rule; and configuring (block 908) the UE with the measurement gap for performing one or more radio measurements.

Thus, a UE can operate in unsynchronized DC operation based on a rule or an indication to determine a pair of subframes from MCG and SCG to use for determining the measurement gap length (MGL), and use the determined MGL for performing the measurements. The UE does not transmit and receive signals in a subframe either before or after the MGL. The subframe occurs immediately before or immediately after the MGL is dependent on the rule.

In a further embodiment, the method in the network node configures (block 906) the UE with the selected one of the plurality of pre-defined rules, by transmitting configuration information to configure the UE to determine (block 602 of FIG. 6) subframe pairs between the MCG and the SCG with respect to the measurement gap length in the MCG on which the measurement gap length in the SCG can be configured.

The UE may transmit the configuration information to configure the UE by transmitting the configuration information to configure the UE to identify one of the subframe pairs as a subframe in the MCG and a subframe in the SCG that overlap with each other in a defined time slot.

The UE may alternatively or additionally transmit the configuration information to configure the UE by transmitting the configuration information to configure the UE to identify a subframe in the SCG that starts after a defined subframe in a MCG gap.

The network node can use this information of the selected one of the pre-defined rules and the measurement gap length used by the UE to adapt scheduling of resources (e.g. UL allocation, grant, etc) for UEs so that the UE is not scheduled in a subframe before or after the gap where the UE is not required to transmit. The network node may alternatively or additionally use this information to assign resources (e.g. UL allocation, grant, etc) to another UE that can transmit in a subframe where the UE configured with unsynchronized DC cannot transmit.

Thus in further embodiments, the method by the network node can schedule resources for assignment to UEs so that the UE is not scheduled for transmission in a subframe before or after a measurement gap. The method by the network node can schedule the resources for assignment to another UE that can transmit in the subframe before or after the measurement gap.

Potential advantages that may be provided by one or more of these methods can include that the behavior of the UE can be known to the network node for how the UE will perform measurements during the measurement gap while the UE is configured to operate in unsynchronized DC, and more specific behavior of the UE can be known to the network node in terms of the subframe available for scheduling in UL and/or DL before and after the measurement gap when the UE is configured to operate in unsynchronized DC. Further related advantages may include: the network node can adapt scheduling such that the UE is not scheduled in a subframe before or after the gap where the UE is not required to transmit; and the network node can assign resources (e.g. UL allocation, grant, etc) to another UE (e.g. not in DC operation, UE with synchronized DC operation, etc) that can transmit in a subframe where the UE configured with unsynchronized DC cannot transmit. Such assignment of resources to another UE can ensure that those resources are not wasted and instead are utilized more efficiently.

7. UE Measurement Procedures in RRC CONNECTED State Related to 3GPP TS 36.133

More specific non-limiting embodiments are explained below which are directed to applying various of the embodiments disclosed above to the UE measurement procedures in a RRC_CONNECTED state operating based on 3GPP TS 36.331, e.g., v12.5.0 (2014-09), entitled "Technical Specification Group Radio Access Network; Evolved Universal Terrestrial Radio Access (E-UTRA); Requirements for support of radio resource management."

7.1 General Measurement Requirements 7.1.1 Introduction

Measurement reporting requirements on the UE in RRC_CONNECTED state are split in E-UTRA intra frequency, E-UTRA inter frequency, Inter-RAT UTRA FDD, UTRA TDD and GSM measurements. These measurements may be used by the E-UTRAN, e.g. for handover decisions. Control of measurement reporting can be provided according to 3GPP TS 36.331.

When the UE is provided with IDC solution, the UE can also perform RRM measurements and meet the corresponding requirements in Section 7.1.2.

7.1.2 Requirements 7.1.2.1 UE Measurement Capability

If the UE requires measurement gaps to identify and measure inter-frequency and/or inter-RAT cells, in order for the requirements in the following subsections to apply the E-UTRAN must provide a single measurement gap pattern with constant gap duration for concurrent monitoring of all frequency layers and RATs.

During the measurement gaps the UE:
1) cannot transmit any data; and
2) is not expected to tune its receiver on any of the E-UTRAN carrier frequencies of PCell, any SCell and PSCell.

Figure 8:
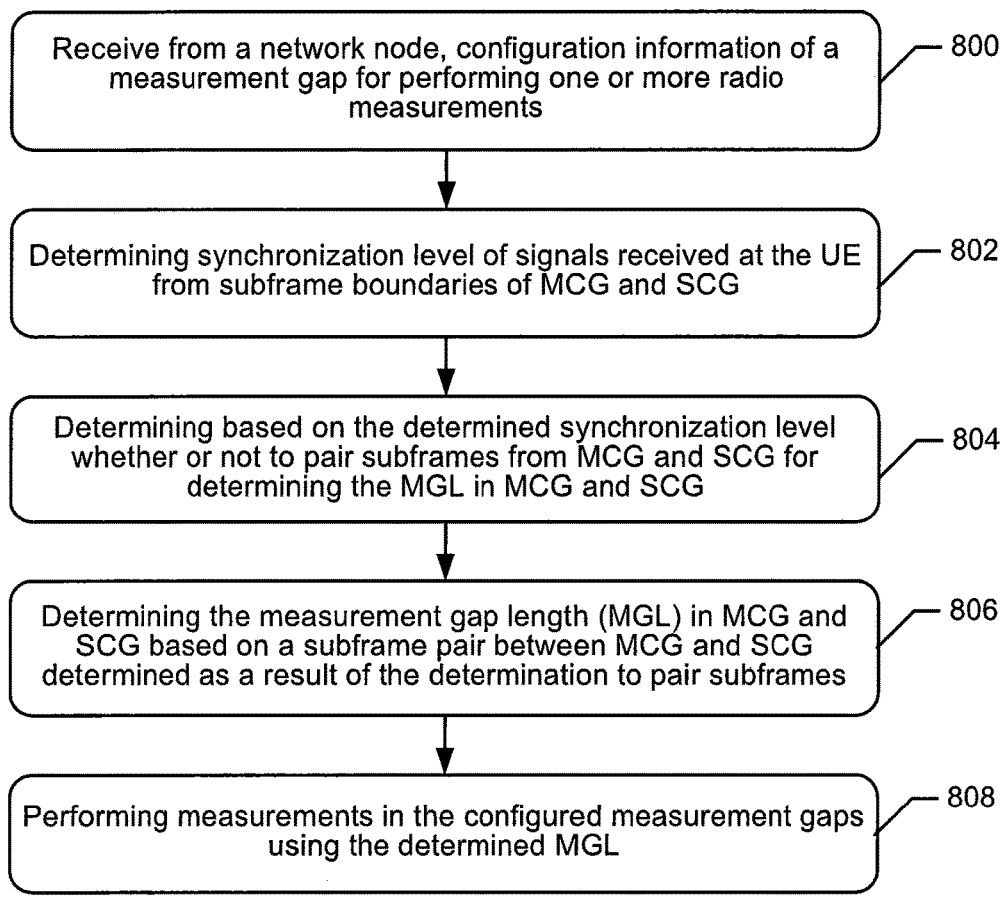

If the UE supporting dual connectivity is configured with PSCell and the maximum received timing difference between MCG and SCG at the UE is more than 33 μs, during the total interruption time as shown in figure 8.1.2.1-1, below, the UE cannot transmit any data in SCG.

The subframe pairs for MCG and SCG can be defined in a way so that the first subframe in the MGL of SCG will be the subframe that starts immediately after the first subframe of MCG has started.

In the uplink subframe occurring immediately after the measurement gap,
1) the E-UTRAN FDD UE cannot transmit any data;
2) the E-UTRAN TDD UE cannot transmit any data if the subframe occurring immediately before the measurement gap is a downlink subframe; and
3) whether the E-UTRAN TDD UE can transmit data or not is up to the UE implementation if the subframe occurring immediately before the measurement gap is an uplink subframe.

In the subframe occurring prior to the measurement gap in SCG, the UE cannot transmit or receive any data.

Inter-frequency and inter-RAT measurement requirements within this Section rely on the UE being configured with one measurement gap pattern unless the UE has signaled that it is capable of conducting such measurements without gaps. UEs can only support those measurement gap patterns listed in Table 8.1.2.1-1, below, that are relevant to its measurement capabilities.

If the UE supporting E-UTRA carrier aggregation when configured with one or two SCCs is performing measurements on cells on PCC, inter-frequency measurements, or inter-RAT measurements, and interruption occurs on PCell or any activated SCell or both due to measurements performed on cells on an SCC with a deactivated SCell, then the UE can meet the requirements specified for each measurement in Section 7.

If the UE supporting E-UTRA dual connectivity when configured with a PSCell is performing measurements on cells on PCC, inter-frequency measurements, or inter-RAT measurements, then the UE can meet the requirements specified for each measurement in Section 7.

7.1.2.1.1 Monitoring of Multiple Layers Using Gaps

When monitoring of multiple inter-frequency E-UTRAN and inter-RAT (UTRAN, GSM) using gaps (or without using gaps provided the UE supports such capability) is configured, the UE can be capable of performing one measurement of the configured measurement type (RSRP, RSRQ, RSTD, UTRAN TDD P-CCPCH RSCP, UTRAN FDD CPICH measurements, GSM carrier RSSI, etc.) of detected cells on all the layers.

The effective total number of frequencies excluding the frequencies of the PCell, SCells and PSCell being monitored is $N_{freq}$, is defined as:

$$N_{freq} = N_{freq,\ E\text{-}UTRA} + N_{freq,\ UTRA} + M_{gsm} + N_{freq,\ cdma2000} + N_{freq,\ HRP}$$

where
$N_{freq,\ EUTRA}$ is the number of E-UTRA carriers being monitored (FDD and TDD);
$N_{freq,\ UTRA}$ is the number of UTRA carriers being monitored (FDD and TDD);
$M_{GSM}$ is an integer which is a function of the number of GSM carriers on which measurements are being performed (e.g., $M_{GSM}$ is equal to 0 if no

TABLE 8.1.2.1-1

Gap Pattern Configurations supported by the UE

| Gap Pattern Id | Measurement Gap Length (MGL, ms) | Measurement Gap Repetition Period (MGRP, ms) | Minimum available time for inter-frequency and inter-RAT measurements during 480 ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

Figure 10:
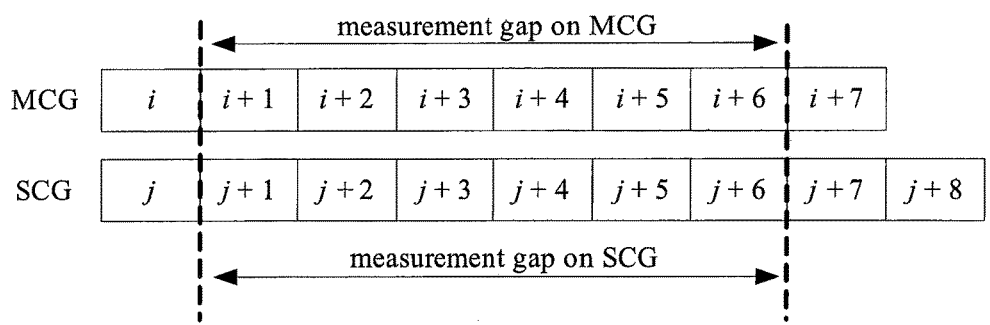
FIG. 10 illustrates measurement gaps configured on MCG and SCG according to maximum received timing difference at the UE, according to some embodiments.
Figure 10:
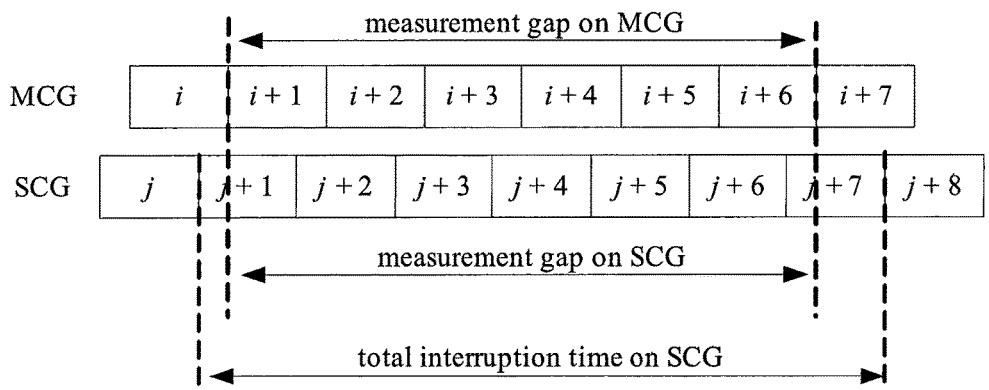

NOTE 1:
When inter-frequency RSTD measurements are configured and the UE requires measurement gaps for performing such measurements, only Gap Pattern 0 can be used. For defining the inter-frequency and inter-RAT requirements, $T_{inter1}$ = 30 ms can be assumed.
NOTE 2:
A measurement gap starts at the end of the latest subframe occurring immediately before the measurement gap among the subframes in MCG serving cells.
NOTE 3:
MGL is the time duration from starting of receiver tuning to the end of receiver retuning, which is aligned between MCG and SCG. The total interruption time on SCG is 7 subframes when the maximum received timing difference between MCG and SCG at the UE is more than 33 μs as shown in FIG. 10.

A UE that is capable of identifying and measuring inter-frequency and/or inter-RAT cells without gaps can follow requirements as if Gap Pattern Id #0 had been used and the minimum available time Tinter 1 of 60 ms can be assumed for the corresponding requirements.

GSM carrier is being monitored. For a MGRP of 40 ms, $M_{GSM}$ is equal to 1 if cells on up to 32 GSM carriers are being measured. For a MGRP of 80 ms, $M_{GSM}$ is equal to ceil($N_{carriers,\ GSM}/20$) where $N_{carriers,GSM}$ is the number of GSM carriers on which cells are being measured;

$N_{freq,\ cdma2000}$ is the number of cdma2000 1× carriers being monitored; and $N_{freq,\ HRPD}$ is the number of HRPD carriers being monitored.

8. Example User Equipment and Network Node

Figure 11:
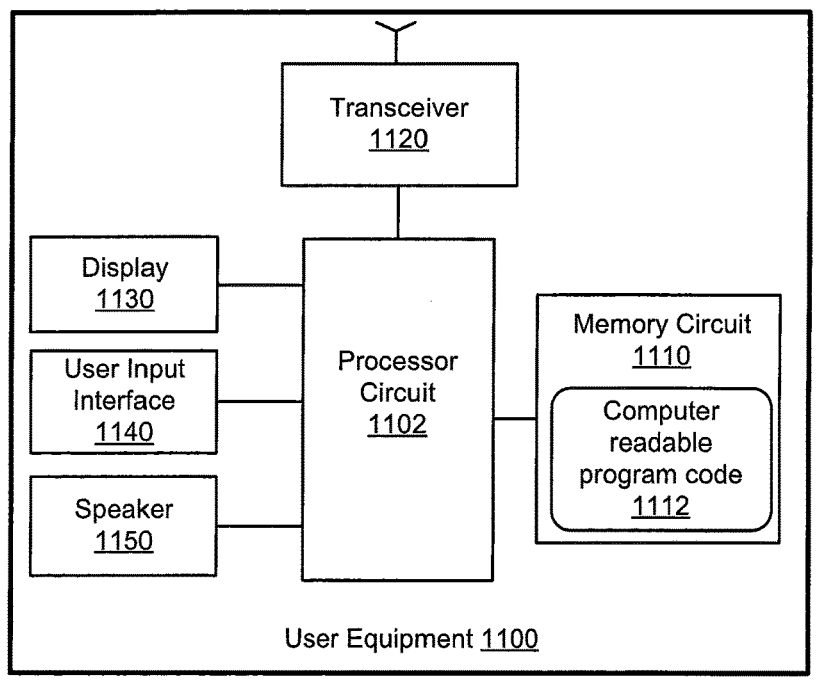
FIG. 11 is a block diagram illustrating components of a user equipment configured according to some embodiments.

FIG. 11 is a block diagram of a UE 1100, for use in a telecommunications system, that is configured to perform operations according to one or more embodiments disclosed herein. The UE 1100 includes a transceiver 1120, a processor circuit 1102, and a memory circuit 1110 containing computer readable program code 1112. The UE 1100 may further include a display 1130, a user input interface 1140, and a speaker 1150.

The transceiver 1120 is configured to communicate with network nodes, such as the MeNB and the SeNB, through a wireless air interface using one or more of the radio access technologies disclosed herein. The processor circuit 1102 may include one or more data processing circuits, such as a general purpose and/or special purpose processor, e.g., microprocessor and/or digital signal processor. The processor circuit 1102 is configured to execute the computer readable program code 1112 in the memory circuit 1110 to perform at least some of the operations described herein as being performed by a UE.

Figure 12:
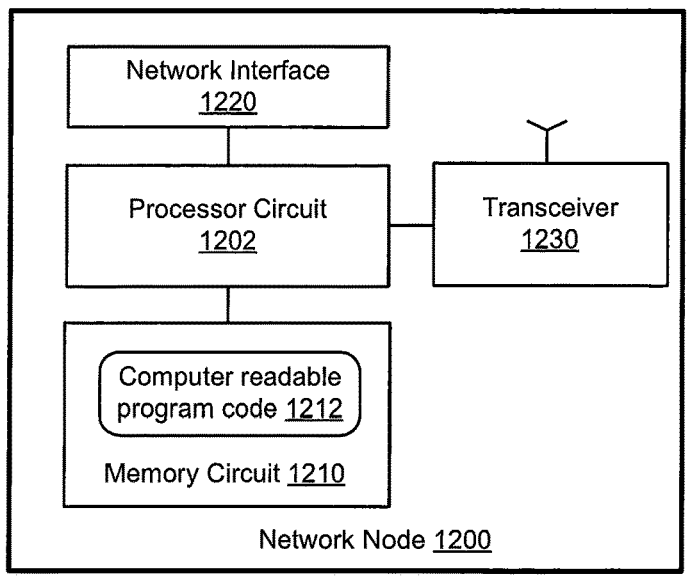
FIG. 12 is a block diagram illustrating components of a network node configured according to some embodiments.

FIG. 12 is a block diagram of a network node 1200, for use in a telecommunications system, that is configured according to one or more embodiments disclosed herein for a network node, such as the MeNB and the SeNB. The network node 1200 can include a transceiver 1230, a network interface 1220, a processor circuit 1202, and a memory circuit 1210 containing computer readable program code 1212.

The transceiver 1230 is configured to communicate with the UE 1200 using one or more of the radio access technologies disclosed herein, when the network node 1200 is a radio network node. The processor circuit 1202 may include one or more data processing circuits, such as a general purpose and/or special purpose processor, e.g., microprocessor and/or digital signal processor, that may be collocated or distributed across one or more networks. The processor circuit 1202 is configured to execute the computer readable program code 1212 in the memory 1210 to perform at least some of the operations and methods of described herein as being performed by a network node. The network interface 1220 communicates with other network nodes and/or a core network.

Figure 13:
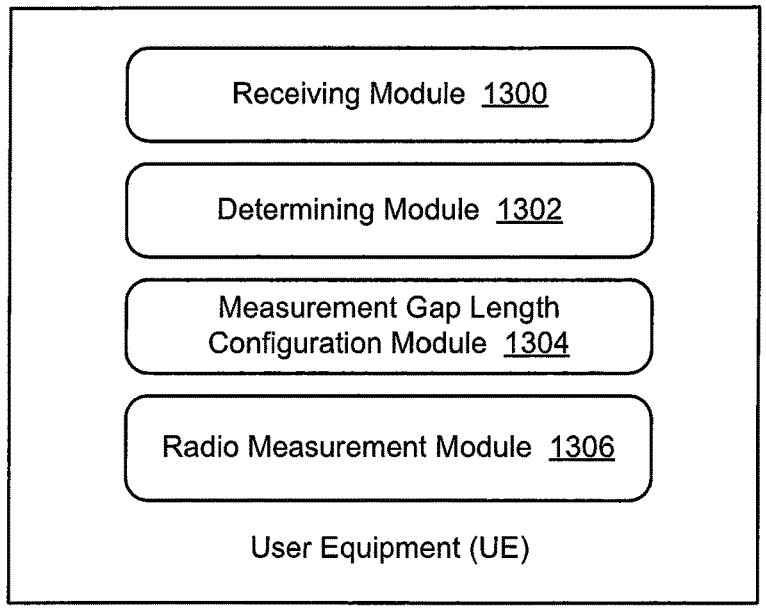
FIG. 13 illustrates modules residing in a UE according to some embodiments.

FIG. 13 illustrates modules residing in a UE, such as the UE 1100 of FIG. 11, that perform operations as disclosed herein according to some embodiments. The UE includes a receiving module 1300, a determining module 1302, a measurement gap length configuration module 1304, and a radio measurement module 1306. The receiving module 1700 operates to receive from the network node configuration information of a measurement gap length for performing one or more radio measurements. The determining module 1302 operates to determine subframe pairs between a MCG and a SCG with respect to measurement gap length in the MCG on which measurement gap length in the SCG can be configured. The measurement gap length configuration module 1304 operates to configure the measurement gap length in at least the SCG using the determined subframe pairs. The radio measurement module 1306 operates to perform one or more radio measurements in the SCG within the configured measurement gap length. The modules 1300-1306 may perform other operations by a UE disclosed herein with regard to FIGS. 1-11.

Figure 14:
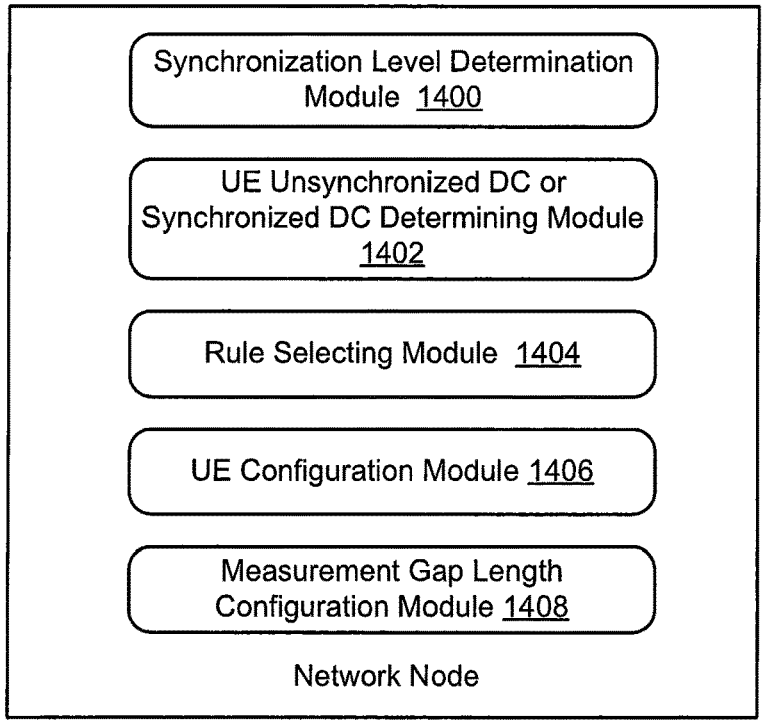
FIG. 14 illustrates modules residing in a network node according to some embodiments.

FIG. 14 illustrates modules residing in a network node, such as the network node 1200 of FIG. 12, that perform operations as disclosed herein according to some embodiments. The network node includes a synchronization level determination module 1400, a UE unsynchronized DC are synchronized DC determining module 1402, a rule selecting module 1404, a UE configuration module 1406, and a measurement gap length configuration module 1408. The synchronization level determination module 1400 operates to determine synchronization level of signals received at the UE from subframe boundaries of a MCG and a SCG. The UE unsynchronized DC or synchronized DC determining module 1402 operates to determine if the UE is configured in unsynchronized DC or if the network node cannot ascertain from the synchronization level whether the UE operates in unsynchronized DC or synchronized DC. The rule selecting module 1404 operates to, based on the outcome of the determining module 1402, select one of a plurality of pre-defined rules based on one or more criteria, wherein the selected one of the pre-defined rules enables the UE to pair subframes from the MCG and the SCG for determining measurement gap length in the MCG and the SCG. The UE configuration module 1406 operates to configure the UE with the selected one of the plurality of pre-defined rules. The measurement Length configuration module 1408 operates to configure the UE with the measurement gap length for operating to perform one or more radio measurements based on the measurement gap length. The modules 1400-1408 may perform other operations by a network node disclosed herein with regard to FIGS. 1-12.

9. Abbreviations

The following abbreviations are herewith defined, at least some of which are referred to within the following description of the present invention.

CA Carrier Aggregation
CC Component Carrier
CG Cell Group
CGI Cell Global Identifier
DC Dual Connectivity
eNB E-UTRAN Node B, also Evolved Node B
FDD Frequency Division Duplex
MCG Master Cell Group
MeNB Master eNB
MGL Measurement Gap Length
MIB Master Information Block
PCC Primary Component Carrier
PCell Primary Cell
PDCCH Physical Downlink Control Channel
PSC Primary Serving Cell
RAT Radio Access Technology
RLM Radio Link Monitoring
RIP Received Interference Power
RRC Radio Resource Control
RRM Radio Related Measurement
RSTD Reference Signal Time Difference
SCC Secondary Component Carrier
SCell Secondary Cell
SCG Secondary Cell Group
SeNB Secondary eNB
SFN System Frame Number
SI System Information
SIB System Information Block
SSC Secondary Serving Cell
TA Timing Advance
TDD Time Division Duplex
UE User Equipment

10. Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by a user equipment, UE, configured in asynchronous dual connectivity, DC, the method comprising:
receiving from a network node, configuration information of a measurement gap length in a master cell group, MCG, for performing one or more radio measurements;
configuring a measurement gap length of at least seven subframes in a secondary cell group, SCG, using subframe pairs, the subframe pairs constituted between the MCG and the SCG with respect to the measurement gap length in the MCG on which the measurement gap length in the SCG is configured;
wherein the MCG measurement gap precedes the SCG measurement gap, the first subframe of the measurement gap length in the SCG is the subframe in the SCG that is identified as starting immediately after the start of the MCG measurement gap;
preventing transmission and reception of data in SCG in the subframe immediately before the first subframe of the measurement gap length of the SCG; and
performing one or more radio measurements in the SCG within the configured measurement gap length.

2. The method of claim 1, further comprising:
determining a synchronization level of signals received at the UE from subframe boundaries of the MCG and the SCG; and
determining based on the synchronization level whether or not to perform the determining subframe pairs between the MCG and the SCG.

3. The method of claim 2, wherein determining synchronization level of signals received at the UE from subframe boundaries of the MCG and the SCG, comprises:
determining the synchronization level based on a received time difference of signals received at the UE from the MCG and the SCG.

4. The method of claim 1, further comprising identifying the subframe in the SCG that starts after a defined subframe in a MCG gap; and
wherein configuring the measurement gap length of at least seven subframes in the SCG using the subframe pairs, comprises configuring the measurement gap length in the SCG using the subframe in the SCG that is identified as starting after the defined subframe in the MCG gap.

5. The method of claim 4, wherein the defined subframe in the MCG gap is the first subframe in a measurement gap of the MCG.

6. The method of claim 1, further comprising preventing transmission and reception of data in SCG in a subframe immediately after the last subframe of the measurement gap length of the SCG.

7. A user equipment, UE, configured in asynchronous dual connectivity, DC, and comprising:
a processor and a memory, the memory comprising executable instructions that when executed by the processor cause the processor to:
receive from a network node, configuration information of a measurement gap length in a master cell group, MCG, for performing one or more radio measurements;
configure a measurement gap length of at least seven subframes in a secondary cell group, SCG, using subframe pairs, the subframe pairs constituted between the MCG and the SCG with respect to the measurement gap length in the MCG on which the measurement gap length in the SCG is configured;
wherein the MCG measurement gap precedes the SCG measurement gap, the first subframe of the measurement gap length in the SCG is the subframe in the SCG that is identified as starting immediately after the start of the MCG measurement gap;
prevent transmission and reception of data in SCG in the subframe immediately before the first subframe of the measurement gap length of the SCG; and
perform one or more radio measurements in the SCG within the configured measurement gap length.

8. The UE of claim 7, where the UE is further configured to:
determine a synchronization level of signals received at the UE from subframe boundaries of the MCG and the SCG; and
determine based on the synchronization level whether or not to perform the determining subframe pairs between the MCG and the SCG.

9. The UE of claim 8, wherein determining a synchronization level of signals received at the UE from subframe boundaries of the MCG and the SCG, comprises:
determining the synchronization level based on a received time difference of signals received at the UE from the MCG and the SCG.

10. The UE of claim 7, wherein the UE is further configured to:
identify the subframe in the SCG that starts after a defined subframe in a MCG gap; and
configure the measurement gap length of at least seven subframes in the SCG using the subframe pairs the SCG using the determined subframe pairs, comprises configuring the measurement gap length in the SCG using the subframe in the SCG that is identified as starting after the defined subframe in the MCG gap.

11. The UE of claim 7, wherein the UE is further configured to prevent transmission and reception of data in the SCG in a subframe immediately after the last subframe of the measurement gap length of the SCG.

12. A method by a network node serving a user equipment, UE, configured in asynchronous dual connectivity, DC, the method comprising:
determining synchronization level of signals received at the UE from subframe boundaries of a master cell group, MCG, and a secondary cell group, SCG;
determining one of the UE is configured in unsynchronized DC or the network node cannot ascertain from the synchronization level whether the UE operates in unsynchronized DC or synchronized DC;
based on the determining that the UE is configured in unsynchronized DC or that the network node cannot ascertain from the synchronization level whether the UE operates in unsynchronized DC or synchronized DC,
selecting one of a plurality of pre-defined rules based on one or more criteria, wherein the selected one of the pre-defined rules enables the UE to pair subframes from the MCG and the SCG to determine a first measurement gap length in the MCG and a second measurement gap length of at least seven subframes in the SCG, wherein the first subframe of the measurement gap length in the SCG is the subframe in the SCG that is identified as starting immediately after the start of the MCG measurement gap, wherein the MCG measurement gap precedes the SCG measurement gap;
configuring the UE with the selected one of the plurality of pre-defined rules, the selected one of the plurality of pre-defined rules comprising an instruction to prevent transmission and reception of data at the UE in the SCG in a subframe immediately before the first subframe of the second measurement gap length; and configuring the UE with the second measurement gap length for operating to perform one or more radio measurements based on the second measurement gap length.

13. The method of claim 12, wherein configuring the UE with the selected one of the plurality of pre-defined rules, comprises:

transmitting configuration information to configure the UE to determine subframe pairs between the MCG and the SCG with respect to the first measurement gap length in the MCG on which the second measurement gap length in the SCG can be configured.

14. The method of claim 13, wherein transmitting configuration information to configure the UE to determine subframe pairs between the MCG and the SCG with respect to the first measurement gap length in the MCG on which the second measurement gap length in the SCG can be configured, comprises:

transmitting the configuration information to configure the UE to identify one of the subframe pairs as a subframe in the MCG and a subframe in the SCG that overlap with each other in a defined time slot.

15. The method of claim 13, wherein transmitting configuration information to configure the UE to determine subframe pairs between the MCG and the SCG with respect to the first measurement gap length in the MCG on which the second measurement gap length in the SCG can be configured, comprises:

transmitting the configuration information to configure the UE to identify a subframe in the SCG that starts after a defined subframe in a MCG gap.

16. The method of claim 12, further comprising:

scheduling resources for assignment to UEs so that the UE is not scheduled for transmission in a subframe before or after the second measurement gap length.

17. The method of claim 16, further comprising:

scheduling resources for assignment to another UE that can transmit in the subframe before or after the second measurement gap length.

18. A network node serving a user equipment, UE, configured in asynchronous dual connectivity, DC, the network node comprising:

a processor and a memory, the memory comprising executable instructions that when executed by the processor cause the processor to:

determine synchronization level of signals received at the UE from subframe boundaries of a master cell group, MCG, and a secondary cell group, SCG;

determine one of the UE is configured in unsynchronized DC or the network node cannot ascertain from the synchronization level whether the UE operates in unsynchronized DC or synchronized DC;

based on determining that the UE is configured in unsynchronized DC or that the network node cannot ascertain from the synchronization level whether the UE operates in unsynchronized DC or synchronized DC, select one of a plurality of pre-defined rules based on one or more criteria, wherein the selected one of the pre-defined rules enables the UE to pair subframes from the MCG and the SCG to determine a first measurement gap length in the MCG and a second measurement gap length of at least seven subframes in the SCG, wherein the first subframe of the measurement gap length in the SCG is the subframe in the SCG that is identified as starting immediately after the start of the MCG measurement gap, wherein the MCG measurement gap precedes the SCG measurement gap;

configure the UE with the selected one of the plurality of pre-defined rules, the selected one of the plurality of pre-defined rules comprising an instruction to prevent transmission and reception of data at the UE in the SCG in a subframe immediately before the first subframe of the second measurement gap length; and configure the UE with the second measurement gap length for operating to perform one or more radio measurements based on the second measurement gap length.

* * * * *

UNITED STATES PATENT AND TRADEMARK OFFICE
CERTIFICATE OF CORRECTION

| | |
|---|---|
| PATENT NO. | : 10,187,884 B2 |
| APPLICATION NO. | : 14/894490 |
| DATED | : January 22, 2019 |
| INVENTOR(S) | : Kazmi et al. |

It is certified that error appears in the above-identified patent and that said Letters Patent is hereby corrected as shown below:

In the Drawings

In Fig. 9, Sheet 6 of 9, for Block "902", in Line 1, delete "Is the" and insert -- If the --, therefor In the Specification In Column 1, Line 53, delete "pSCell" and insert -- PSCell --, therefor.

In Column 4, Lines 49-50, delete "signal-to-interference-plus-noise (SINR)," and insert -- signal-to-interference-plus-noise ratio (SINR), --, therefor.

In Column 7, Line 44, delete "laptop embedded equipped (LEE)," and insert -- laptop embedded equipment (LEE), --, therefor.

In Column 7, Line 66, delete "Wi Fi," and insert -- WiFi, --, therefor.

In Column 8, Line 52, delete "MCG and MCG" and insert -- MCG and SCG --, therefor.

In Column 9, Line 33, delete "MCG MGL" and insert -- MCG in MGL --, therefor.

In Column 10, Line 6, delete "Configured" and insert -- configured --, therefor.

In Column 11, Line 36, delete "Message" and insert -- message --, therefor.

In Column 11, Line 47, delete "information," and insert -- information: --, therefor.

In Column 15, Line 19, delete "gap," and insert -- gap: --, therefor.

Signed and Sealed this
Seventeenth Day of September, 2019

Andrei Iancu
*Director of the United States Patent and Trademark Office*

CERTIFICATE OF CORRECTION (continued)
U.S. Pat. No. 10,187,884 B2

In Column 16, Lines 27-28, delete "$N_{freq}=N_{freq,\ E\text{-}UTRA}+N_{freq,\ UTRA}+M_{gsm}+N_{freq,\ cdma2000}+N_{freq,\ HRP}$"

and insert -- $N_{freq}=N_{freq,\ E\text{-}UTRA}+N_{freq,\ UTRA}+M_{GSM}+N_{freq,\ cdma2000}+N_{freq,\ HRPD}$ --, therefor.

In Column 16, Line 31, delete "$N_{freq,\ EUTRA}$" and insert -- $N_{freq,\ E\text{-}UTRA}$ --, therefor.

In Column 16, Line 65, delete "ceil($N_{carriers,\ GSM}/20$)" and insert -- cell($N_{carriers,GSM}/20$) --, therefor.

In Column 20, Lines 20-21, delete "(DVD/Blueray)." and insert -- (DVD/Bluray). --, therefor.